US011674207B2

(12) United States Patent
Swartz et al.

(10) Patent No.: US 11,674,207 B2
(45) Date of Patent: Jun. 13, 2023

(54) APPARATUS AND PROCESS FOR PRODUCING ADDITIVE MANUFACTURED METAL MATRIX COMPOSITES AND ARTICLE OF MANUFACTURE THEREOF

(71) Applicant: Impossible Objects, Inc., Northbrook, IL (US)

(72) Inventors: Robert Swartz, Highland Park, IL (US); John Bayldon, Northbrook, IL (US); Buckley Crist, Wilmette, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 0 days.

(21) Appl. No.: 17/455,118

(22) Filed: Nov. 16, 2021

(65) Prior Publication Data

US 2022/0072611 A1    Mar. 10, 2022

Related U.S. Application Data

(60) Division of application No. 16/195,362, filed on Nov. 19, 2018, now Pat. No. 11,173,546, which is a
(Continued)

(51) Int. Cl.
*C22C 47/02*    (2006.01)
*C22C 47/06*    (2006.01)
(Continued)

(52) U.S. Cl.
CPC .............. *C22C 47/025* (2013.01); *B22F 7/04* (2013.01); *B22F 10/10* (2021.01); *B22F 10/66* (2021.01);
(Continued)

(58) Field of Classification Search
None
See application file for complete search history.

(56) References Cited

U.S. PATENT DOCUMENTS

| 2013/0171431 A1* | 7/2013 | Swartz | ...................... B32B 5/26 |
| | | | 156/499 |
| 2015/0231825 A1 | 8/2015 | Swartz | |

FOREIGN PATENT DOCUMENTS

| JP | H08192468 A | 7/1996 |
| JP | 2015196267 A | 11/2015 |
| | (Continued) | |

OTHER PUBLICATIONS

Korean Notice to Submit Response; 10-2018-7017121; dated Mar. 23, 2023.
Japanese Decision of Rejection; 2021-120674; dated Feb. 7, 2023.

*Primary Examiner* — Yung-Sheng M Tsui
*Assistant Examiner* — Melody Tsui
(74) *Attorney, Agent, or Firm* — Dunlap Bennett & Ludwig, PLLC

(57) ABSTRACT

A method, product, apparatus, and article of manufacture for the application of the Composite Based Additive Manufacturing (CBAM) method to produce objects in metal, and in metal fiber hybrids or composites. The approach has many advantages, including the ability to produce more complex geometries than conventional methods such as milling and casting, improved material properties, higher production rates and the elimination of complex fixturing, complex tool paths and tool changes and, for casting, the need for patterns and tools. The approach works by slicing a 3D model, selectively printing a fluid onto a sheet of substrate material for each layer based on the model, flooding onto the substrate a powdered metal to which the fluid adheres in printed areas, clamping and aligning a stack of coated sheets, heating the stacked sheets to melt the powdered metal and
(Continued)

fuse the layers of substrate, and removing excess powder and unfused substrate.

7 Claims, 7 Drawing Sheets

Related U.S. Application Data continuation of application No. 15/631,634, filed as application No. PCT/US2016/062356 on Nov. 16, 2016.

(60) Provisional application No. 62/256,436, filed on Nov. 17, 2015.

(51) Int. Cl.
| | |
|---|---|
| C22C 47/20 | (2006.01) |
| C22C 49/14 | (2006.01) |
| B33Y 30/00 | (2015.01) |
| B33Y 40/00 | (2020.01) |
| B29C 64/194 | (2017.01) |
| B29C 64/205 | (2017.01) |
| B29C 64/165 | (2017.01) |
| B22F 10/10 | (2021.01) |
| B22F 12/00 | (2021.01) |
| B22F 10/66 | (2021.01) |
| B22F 7/04 | (2006.01) |
| B29C 67/00 | (2017.01) |
| B33Y 10/00 | (2015.01) |
| B33Y 80/00 | (2015.01) |
| B29C 64/112 | (2017.01) |
| B22F 10/73 | (2021.01) |
| B22F 12/53 | (2021.01) |
| B22F 10/62 | (2021.01) |
| B22F 3/02 | (2006.01) |
| B22F 3/10 | (2006.01) |
| B22F 7/06 | (2006.01) |
| B22F 7/08 | (2006.01) |

(52) U.S. Cl.
CPC ............ *B22F 12/00* (2021.01); *B29C 64/165* (2017.08); *B29C 64/194* (2017.08); *B29C 64/205* (2017.08); *B29C 67/00* (2013.01); *B33Y 10/00* (2014.12); *B33Y 30/00* (2014.12); *B33Y 40/00* (2014.12); *B33Y 80/00* (2014.12); *C22C 47/062* (2013.01); *C22C 47/20* (2013.01); *C22C 49/14* (2013.01); *B22F 3/02* (2013.01); *B22F 3/1035* (2013.01); *B22F 3/1039* (2013.01); *B22F 7/062* (2013.01); *B22F 7/08* (2013.01); *B22F 10/62* (2021.01); *B22F 10/73* (2021.01); *B22F 12/53* (2021.01); *B22F 2007/045* (2013.01); *B22F 2201/01* (2013.01); *B22F 2998/10* (2013.01); *B22F 2999/00* (2013.01); *B29C 64/112* (2017.08); *Y02P 10/25* (2015.11)

(56) References Cited

FOREIGN PATENT DOCUMENTS

| WO | WO-2014134224 A2 * | 9/2014 | ............ B29C 64/10 |
|---|---|---|---|
| WO | 2014209994 A2 | 12/2014 | |
| WO | 2014134224 A3 | 10/2015 | |
| WO | 2014202041 A8 | 2/2016 | |

* cited by examiner

APPARATUS AND PROCESS FOR PRODUCING ADDITIVE MANUFACTURED METAL MATRIX COMPOSITES AND ARTICLE OF MANUFACTURE THEREOF

This is a divisional of application Ser. No. 16/195,362 filed Nov. 19, 2018, now U.S. Pat. No. 11,173,546 issuing Nov. 16, 2021, which is a continuation of application Ser. No. 15/631,634 filed Jun. 23, 2017, which is a continuation of PCT/US16/62356 filed Nov. 16, 2016, which claimed the benefit of U.S. Provisional Application No. 62/256,436, filed Nov. 17, 2015. This application incorporates the following applications by reference in their entireties (including their drawing figures): Application Nos. U.S. Ser. No. 16/195, 362, U.S. Ser. No. 15/631,634, PCT/US16/62356, U.S. 61/528,537, PCT/US12/52946, U.S. Ser. No. 13/582,939; EP20120828967, U.S. 61/769,724, PCT/US14/18806; U.S. Ser. No. 14/835,685, U.S. Ser. No. 14/835,690, U.S. Ser. No. 14/835,697, U.S. Ser. No. 14/703,372, U.S. 62/243,590, U.S. 61/773,810, U.S. Ser. No. 14/199,603, U.S. 61/914,613 and U.S. Ser. No. 14/566,661.

TECHNICAL FIELD OF THE INVENTION

The present invention relates generally to three-dimensional fabrication.

BACKGROUND OF INVENTION

International Publication No. WO 2014/134224 A2 (corresponding to Application No. PCT/US14/18806) entitled "Methods and Apparatus for Three-Dimensional Composites" (as well as Application Nos. 61/528,537; PCT/US12/52946; U.S. Ser. No. 13/582,939; EP20120828967; U.S. 61/769,724; U.S. Ser. No. 14/835,685; U.S. Ser. No. 14/835,690; U.S. Ser. No. 14/835,697; U.S. Ser. No. 14/703,372; U.S. 62/243,590) describes a "layered" method and apparatus for producing three dimensional objects called "Composite Based Additive Manufacturing" or CBAM that produces a three-dimensional object using generally substrates, typically fibrous substrates and polymers. The present invention references International Publication No. WO 2014/134224 A2, and describes use of the technique described in the International Publication with metals.

SUMMARY OF THE INVENTION

The CBAM method described in International Publication No. WO 2014/134224 A2 extends the range of materials that can be used with 3D printing to create three-dimensional objects. Until recently, work on this technique has concentrated on using various substrates, including carbon fiber, polymer based material and natural fibers among others and various polymers as bonding agents. This application describes the application of the CBAM method and apparatus to produce objects in metal, and in metal fiber hybrids or composites. This application also describes an article of manufacture thereof.

This approach has a number of advantages including: the ability to produce more complex geometries than conventional methods such as milling and casting; improved material properties over conventional metals; higher production rates; the elimination of complex fixturing, complex tool paths and tool changes; and, in the case of casting, the need for patterns and tools.

DETAILED DESCRIPTION OF INVENTION

Output of the Technique

Figure 1:
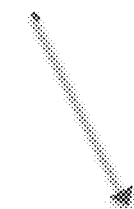
FIG. 1 is a metal piece made by the method described in this application.
Figure 1:
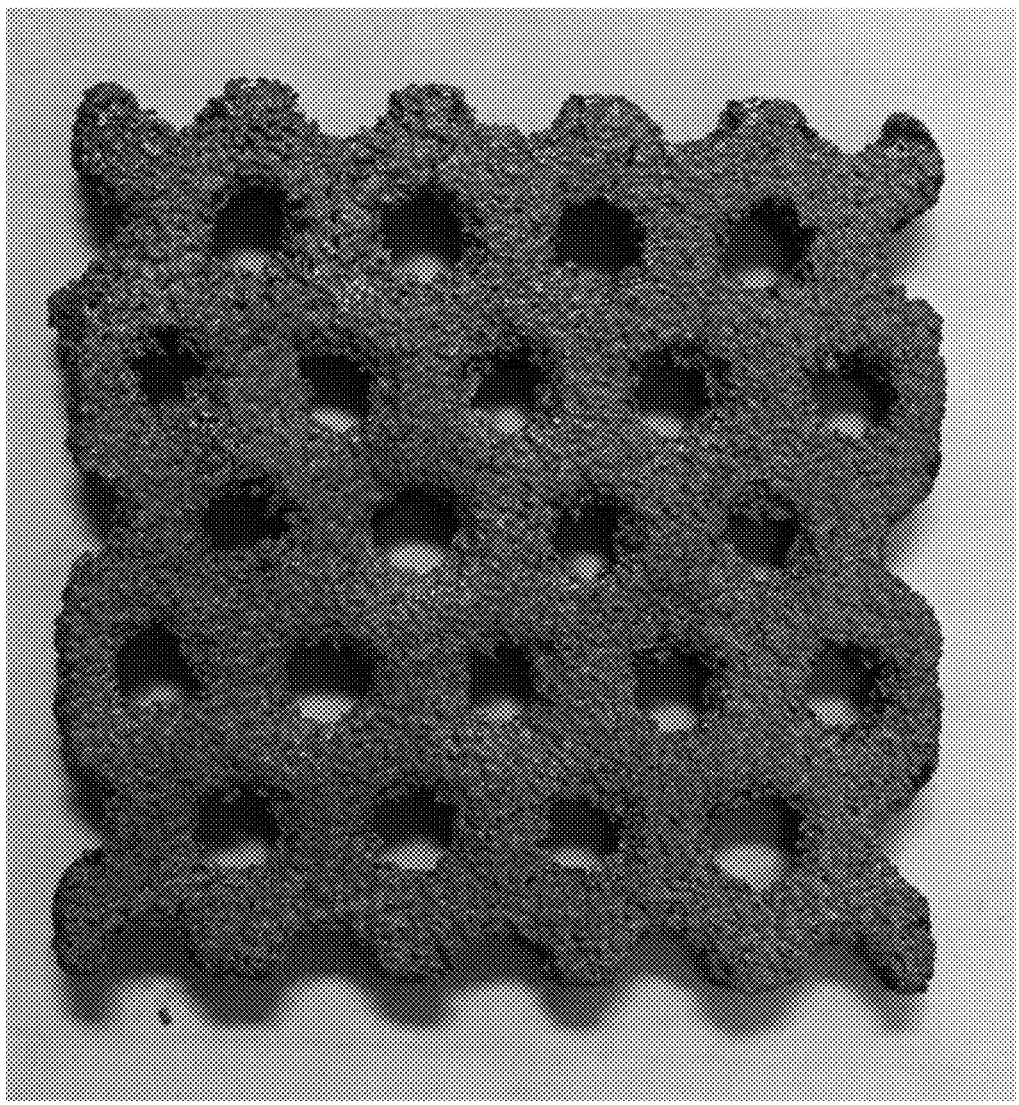

FIG. 1 is a metal piece 100 made by the method described in this application. The method of making this metal piece is described in detail below.

Description of the Technique

Figure 2:
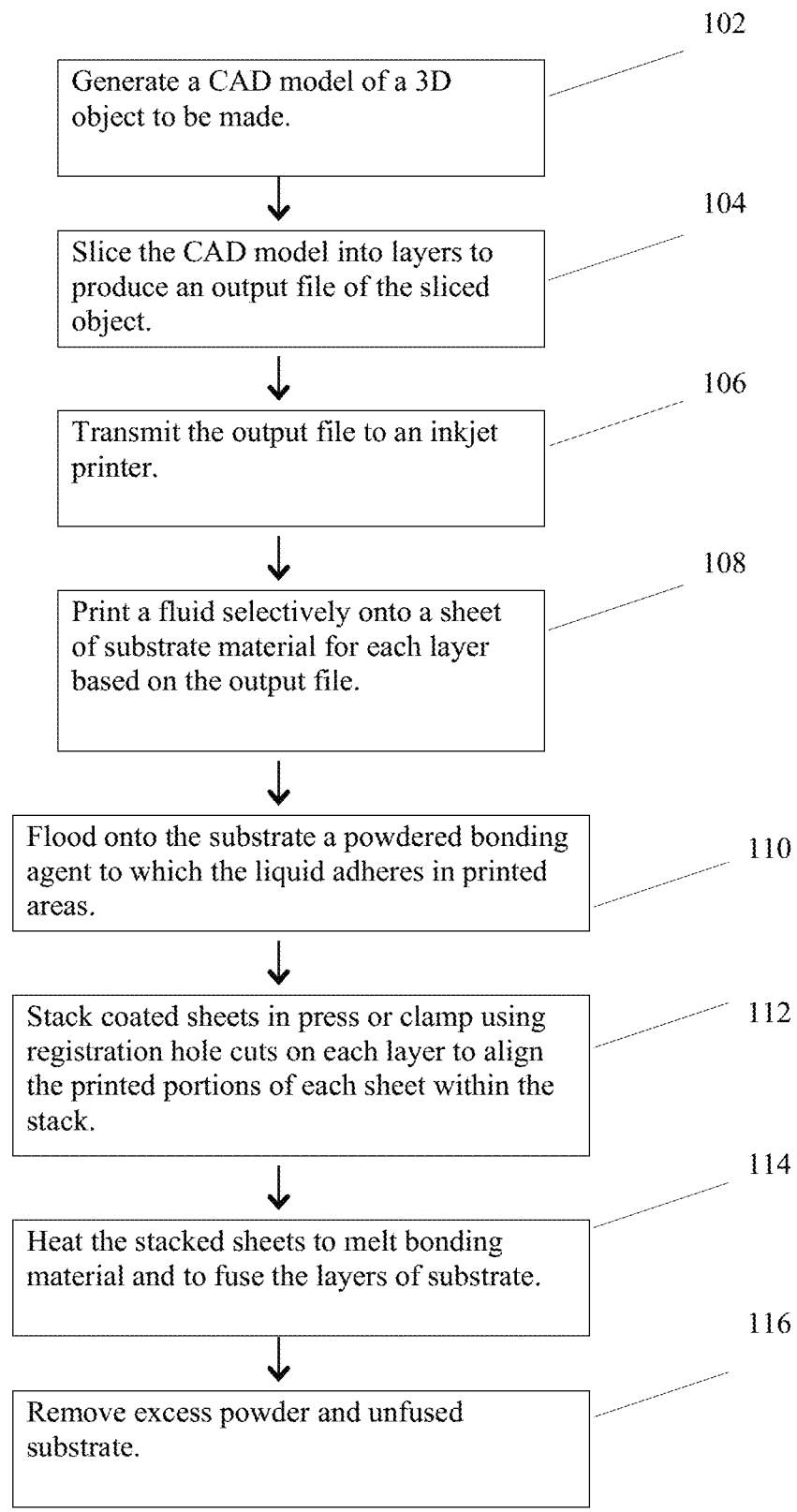
FIG. 2 is a flowchart illustrating the steps to produce a 3D metal object n accordance with the teachings of the present invention.

FIG. 2 is a flowchart illustrating the steps to produce a 3D metal object in accordance with the teachings of the present invention:

1. Generate a CAD model (Step 102) which is sliced into layers (Step 104) by using a slicer program like Netfabb as described in (International Publication No. WO 2014/134224 A2, ¶0055; see also U.S. Application Nos. 61/528, 537 and U.S. 61/769,724). Each slice also includes registration holes, which will be used to orient each printed layer of substrate within the finished object exactly (International Publication No. WO 2014/134224 A2, ¶1100121).

2. The output of the slicer, which for example may be a bitmap file, is sent to an inkjet printer (Step 106). For each layer, the printer selectively prints a fluid onto a sheet of substrate material (Step 108) (International Publication No. WO 2014/134224 A2, ¶00113). The fluid may either be the bonding agent itself in liquid form; or it may be a liquid to which a powdered bonding agent adheres. Substrates can include fiberglass, high temperature glass fibers, boron fibers, or carbon fibers.

3. if powdered bonding agent is being used, it is flooded onto the printed substrate (International Publication No. WO 2014/134224 A2, ¶0059). The powder adheres to the printed areas. Excess powder is removed, either by a stream of air, vacuum, vibration, or other mechanical means.

4. The coated sheets of substrate are stacked in press or clamp (Step 110) (International Publication No. WO 2014/134224 A2, ¶00124), using the registration holes of each layer to align the printed portions of each sheet within the stack (International Publication No. WO 2014/134224 A2, ¶00106).

5. The assembled sheets are then heated and possibly compressed in an oven, to melt the bonding material and fusing the layers of substrate to form the 3D object (Step 112) (International Publication No. WO 2014/134224 A2, ¶00149).

6. The unfused substrate around the 3D object is then removed (Step 114), usually by abrasive blasting material or chemical means (International Publication No. WO 2014/134224 A2, ¶0081).

Issues in Using Metals with the Technique

It has been discovered that metals can be used with this technique. In one example the substrate used is a non-woven carbon fiber veil such as available from Hollingsworth and Vase. Veils that have been metal coated can also be used. The veil or substrate is printed as described above on an inkjet printer using, for example, a HP45 thermal inkjet head with a solution primarily of de-ionized water, pyrrolidone and alcohol. The solution may have an anti-evaporant including glycols and pyrrolidones. This fluid is printed on the area of the substrate that would be part of the object, i.e., the printed area corresponds to a layer shape for the object. This is done for each layer as described in the previous applications. Each layer is flooded with a metal powder for example a solder powder. The excess powder is removed by mechanical, vacuum, vibration or compressed air or a combination of such methods. This leaves the solder powder selectively deposited. One of the problems with using a metal powder in a process of this kind is that the powder oxidizes so that when heated to its melting point the particles of the powder will not fuse together well. There are a number of solutions to this problem, one such solution is to mix the metal powder with a powder flux such as rosin which acts as a reducing agent. A typical flux to metal powder ratio is about 50/50. Another method is to melt the powders in a reducing, vacuum and/or inert atmosphere oven. In this way other metals or alloys can be used, such as aluminum, steel, stainless steel, copper, brass, and titanium among others. In addition liquid flux may be used as or in combination with the printing fluid, through selective deposition methods such as inkjet printing.

As an example the metal powder can be mixed with a powder flux before it is deposited on the substrate. Then all the layers of the object are printed and stacked in register as described in the earlier applications. They are compressed and heated as described in the earlier applications. The heating temperature is raised to the melting point of the powder. The layers fuse together and produce a build block. After the build block is removed from the compression jig the build block is abrasively blasted and the areas where no powder adhered, that is the portions of the object that were not coated with metal, are abrasive blasted off, the uncoated carbon fiber being very fragile. What is left is a three dimensional carbon fiber metal composite of the part that was represented by the CAD model.

Figure 3:
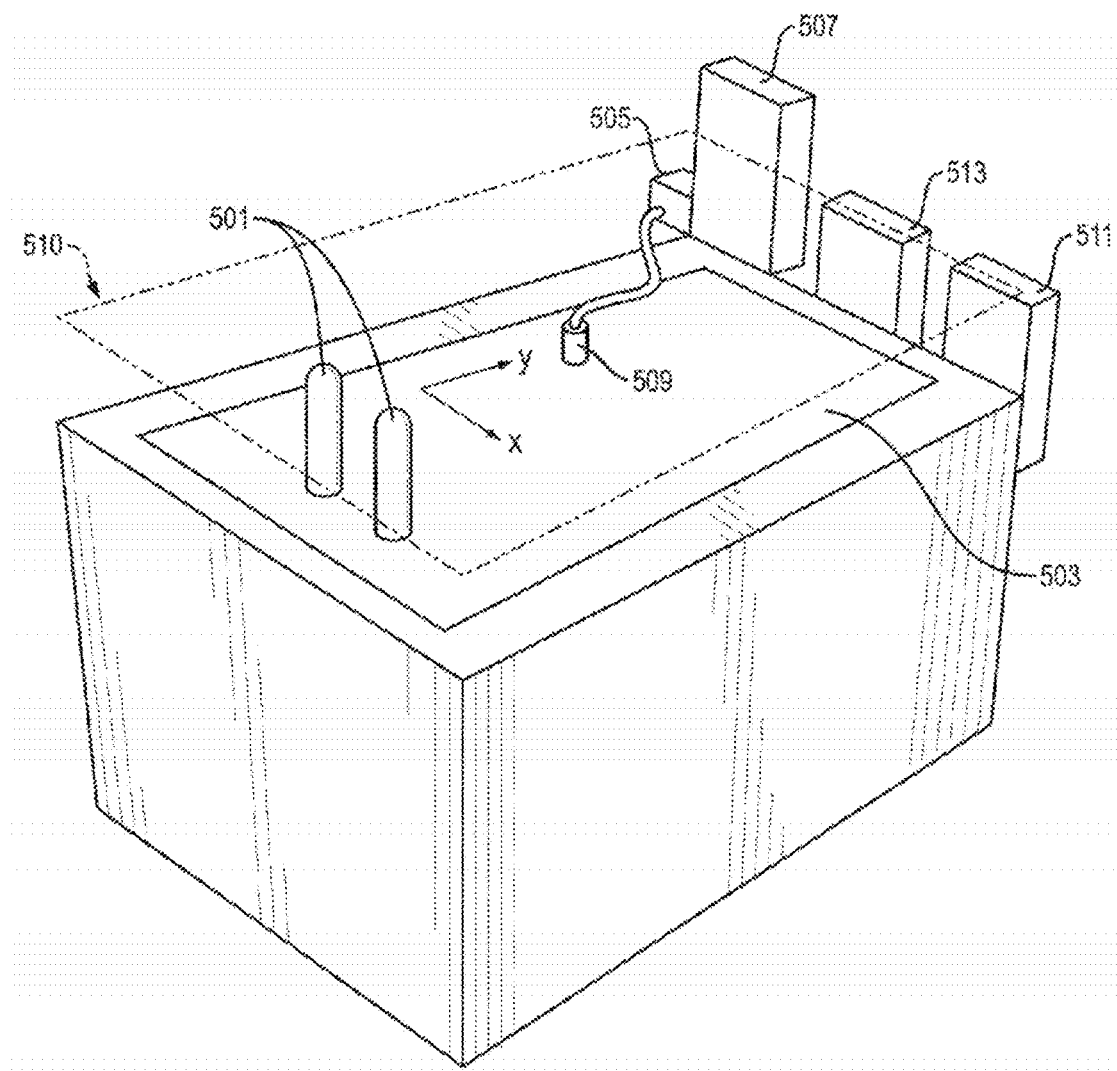
FIG. 3 shows an apparatus used to selectively deposit liquid (to which powder adheres), in an illustrative implementation of this invention.

FIG. 3 shows an apparatus used to selectively deposit liquid (to which powder adheres), in an illustrative implementation of this invention. Registration guide pins 501 are inserted through a substrate layer 503 in order to properly align the substrate layer 503. A solenoid valve, or inkjet head or heads 505 are used to selectively dispense from a liquid reservoir 507 though a nozzle 509 unto the substrate layer 503. The nozzle 509 is rastered in a 2D plane 510 that is parallel to, and above, the substrate layer 503, so that the liquid is selectively deposited at desired x, y coordinates of the substrate layer 503, and not deposited in other areas of the substrate layer 503. To achieve this rastering, a stepper motor 511 actuates two belts (not shown) that causes a support member (not shown) to move along two rails (not shown) in a direction parallel to the x axis. A second stepper motor (not shown) and third belt (not shown) are mounted on the support member, and are used to move a nozzle support (not shown) in a direction parallel to the y axis. The nozzle 509 is attached to the nozzle support. Together, the two stepper motors can move the nozzle 509 to any desired x, y coordinate above the substrate layer. A page wide head may also be used. A microprocessor 513 controls the stepper motors and the solenoid valve or inkjet head, thereby controlling when and where liquid is dispensed on the substrate layer 503. Alternately, rather than rastering in a line-by-line pattern, the stepper motors may cause the nozzle or nozzles 509 to move in other 2D patterns in the 2D plane to cause the liquid to be deposited at certain x, y coordinates. FIG. 2 does not show an apparatus for heating and pressing multiple layers of substrate, or for removing excess substrate. In some implementations, the substrate layer is moved to a different position before those steps occur.

Figure 4:
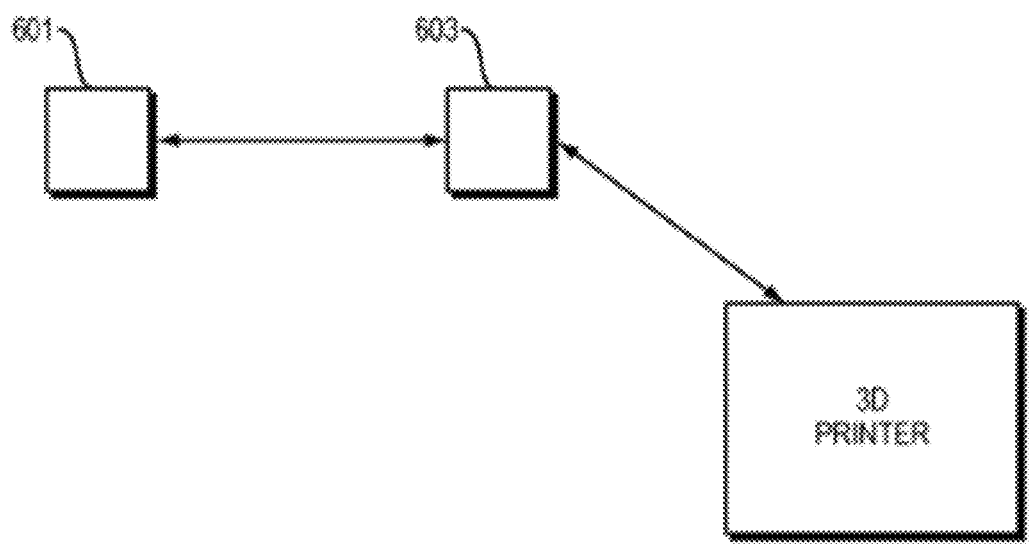
FIG. 4 is a high-level block diagram of processors, in an illustrative implementation of this invention.

FIG. 4 is a high-level block diagram of processors, in an illustrative implementation of this invention. A CAD model of a desired 3D object in STL file format is created using a remote processor 601. This processor 601 employs software (such as Netfabb™ Studio software) to create a machine-specific build file. The machine-specific build file is exported to a second processor 603. Depending on the particular implementation, this second processor controls the operation, including movements, of: (1) an inkjet head or other device that selectively deposits liquid, (2) a vibrating trough (and/or compressed air) that spreads out the powder on the substrate and then removes the excess powder. Alternately, this invention may be implemented with other arrangements of processors. For example, more than one remote processor and more than one onboard processor may be employed, and any of the above tasks may be handled by one or more of these different processors.

Figure 5:
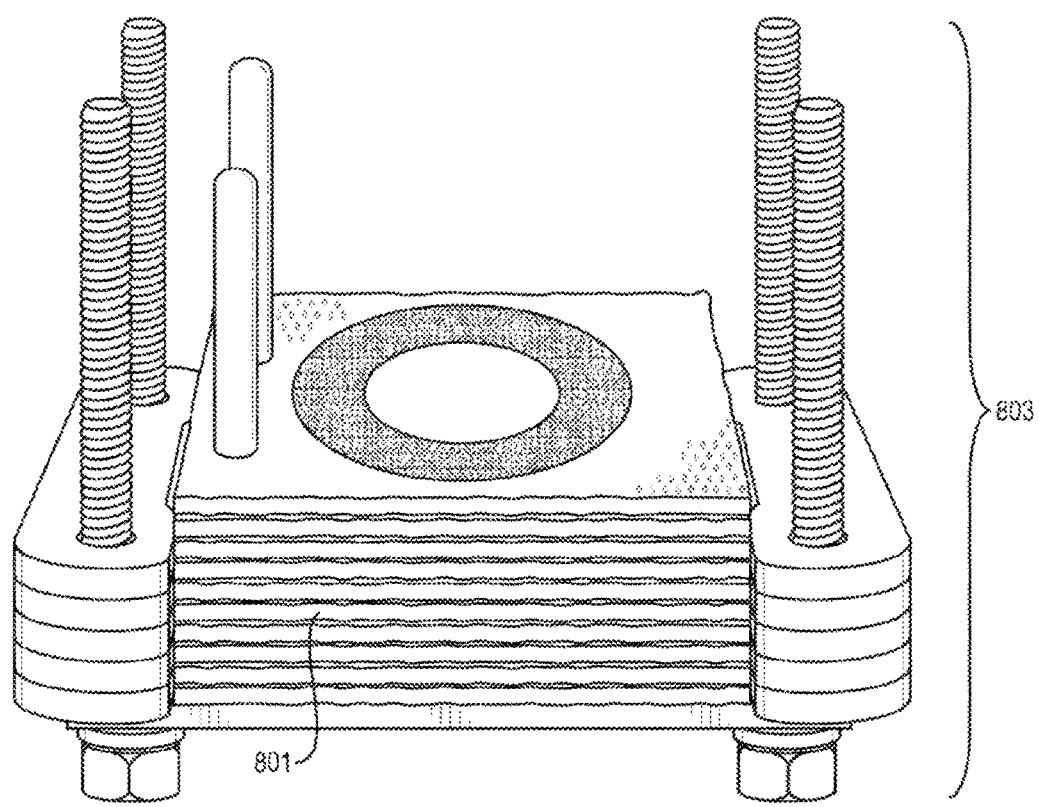
FIG. 5 shows a compressive device, after a number of substrate tiles (layers) have been placed in it, one on top of the other in a compressive device. The tiles are aligned by inserting registration pins of the compressive device into the registration holes of each tile, respectively.

As described in WO2014134224 ¶ 183 (the entirety of the publication which is incorporated by reference), the printed carbon fiber substrate 801 is placed onto a fixture using registration holes to align. FIG. 5 shows a compressive device 803, after a number of substrate layers (e.g., 801) have been placed in it, one on top of the other in order and in registered alignment. Shown are registration pins projecting out of the registration holes of each tile, respectively, to cause such registered alignment.

Figure 6:
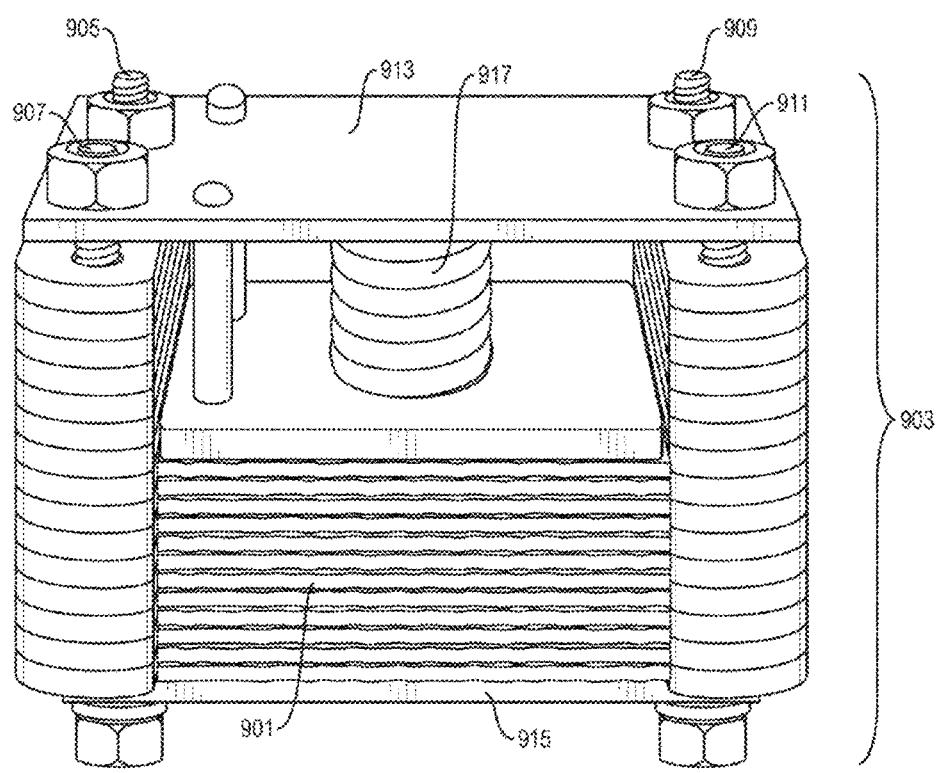
FIG. 6 shows a compressive device, after substrate layers with all of the "slices" of a ring torus have been inserted into it. Springs in the compressive device press the substrate layers together.

FIG. 6 shows substrate layers being compressed in the compressive device 903. Screws 905, 907, 909, 911, plates 913, 915 and a spring 917 in the compressive device are used to exert pressure.

Figure 7:
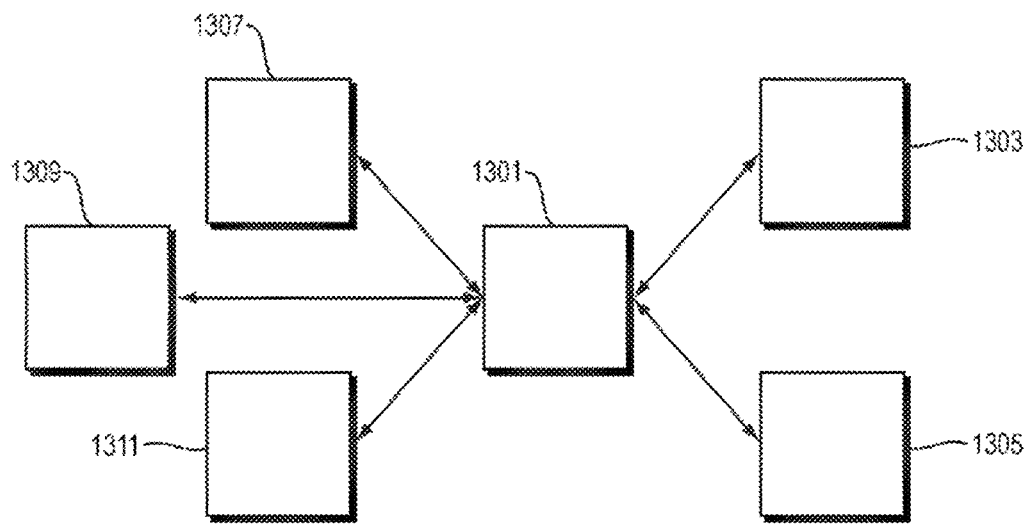
FIG. 7 is a block diagram that shows a processor that controls multiple components of an apparatus for fabricating a 3D object.

FIG. 7 is a high-level block diagram of some hardware that may be used in this invention. One or more processors 1301 control an applicator 1303, a heating element 1305, an actuator 1307, an artificial pressure source 1309, and a stirrer container of liquid 1311. The applicator 1303 deposits powder in positive regions, but not in negative regions, of substrate layers. The heating element 1305 transforms the powder into matter that flows and then hardens. The resulting hardened material is disposed in a spatial pattern that infiltrates the substrate layers. The artificial pressure source 1309 may comprise a press, clamp, spring, elastic element, or other device for compressing the substrate layers. The stirrer may be used to stir a liquid that is used for removing excess substrate.

The invention claimed is:
1. A method for producing a 3-D object, comprising:
   reading a file of layers of the 3-D object, layer by layer, each layer having a shape;

for each layer, printing a fluid selectively onto a sheet of composite substrate material, the printing on each said sheet of composite substrate material representing the shape of that layer;

flooding through a trough onto each sheet of composite substrate material a powdered mixture of metal and flux that adheres to the selectively printed fluid on each sheet of the composite substrate material as a printed shape to create at least one composite powdered sheet;

removing excess powder from each composite powdered sheet as each powdered substrate sheet is first printed and subsequently flooded with said powdered mixture of metal and flux; and stacking the powdered sheets in registered alignment, after excess powder removal, to form a stack of said composite powdered sheets, wherein each sheet in the stack of composite powdered sheets corresponds to a layer in the file of layers.

2. The method of claim 1, further comprising heating and compressing the stack of powdered sheets to melt the powdered metal mixture and fuse the layers producing the 3-D metal object.

3. The method of claim 1, further comprising removing unfused material from powdered sheets to result in the 3-D) object.

4. The method of claim 1, wherein registration holes are used to stack the powdered sheets in registration.

5. The method of claim 1, wherein the powdered metal is aluminum, steel, copper, brass, or titanium.

6. The method of claim 1, wherein the excess powder is removed by a stream of air, vacuum, or vibration.

7. The method of claim 3, wherein unfused substrate material is removed by air blasting with an abrasive material.

* * * * *